(12) United States Patent
Mochizuki

(10) Patent No.: US 10,033,426 B2
(45) Date of Patent: Jul. 24, 2018

(54) ANTENNA MODULE, WIRELESS DEVICE, AND FIELD DEVICE CONTROL SYSTEM

(71) Applicant: Yokogawa Electric Corporation, Musashino-shi, Tokyo (JP)

(72) Inventor: Satoshi Mochizuki, Tokyo (JP)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 154 days.

(21) Appl. No.: 14/916,796

(22) PCT Filed: Sep. 1, 2014

(86) PCT No.: PCT/JP2014/072891
§ 371 (c)(1),
(2) Date: Mar. 4, 2016

(87) PCT Pub. No.: WO2015/041032
PCT Pub. Date: Mar. 26, 2015

(65) Prior Publication Data
US 2016/0204824 A1    Jul. 14, 2016

(30) Foreign Application Priority Data

Sep. 17, 2013  (JP) .................................. 2013-192339

(51) Int. Cl.
*H04B 1/48*      (2006.01)
*H01Q 9/06*      (2006.01)
(Continued)

(52) U.S. Cl.
CPC ................. *H04B 1/48* (2013.01); *H01Q 1/24* (2013.01); *H01Q 9/065* (2013.01); *H04B 1/38* (2013.01)

(58) Field of Classification Search
CPC combination set(s) only.
See application file for complete search history.

(56) References Cited

U.S. PATENT DOCUMENTS 5,970,393 A * 10/1999 Khorrami ................ H01Q 3/44
340/10.34
7,109,948 B2 * 9/2006 Oyama ................. H01Q 1/241
343/700 MS
(Continued)

FOREIGN PATENT DOCUMENTS

EP     1244174 A1 *  9/2002 ............. H01Q 1/243
JP     2000-4533 A    1/2000
(Continued)

OTHER PUBLICATIONS

Translation Nakai Shinya (Inventor). TDK Corp (Assignee). JP 2007036988 A. (Published Feb. 8, 2007).*
(Continued)

*Primary Examiner* — Nay A Maung
*Assistant Examiner* — Erica Fleming-Hall
(74) *Attorney, Agent, or Firm* — Sughrue Mion, PLLC

(57) ABSTRACT

One aspect of the present invention provides an antenna module includes an antenna, a circuit configured to transmit and receive wireless signals by using the antenna, a housing that stores the circuit to cover circumference of the circuit, an antenna casing that stores the antenna to enable the antenna to transmit and receive wireless signals, and a first connector that is connected to the housing, the first connector being configured to input and output signals which are transmitted and received by the circuit.

19 Claims, 7 Drawing Sheets

(51) Int. Cl.
*H01Q 1/24* (2006.01)
*H04B 1/38* (2015.01)

(56) References Cited

U.S. PATENT DOCUMENTS

| | | | | |
|---|---|---|---|---|
| 8,502,739 | B2* | 8/2013 | Ollikainen | H01Q 1/243 343/702 |
| 2005/0239519 | A1* | 10/2005 | Saitou | H01Q 1/243 455/575.1 |
| 2007/0103372 | A1* | 5/2007 | Yu | G06F 1/1616 343/702 |
| 2007/0182566 | A1* | 8/2007 | Kim | G06K 7/0008 340/572.8 |
| 2008/0211664 | A1* | 9/2008 | Griech | G05B 19/042 340/539.1 |
| 2009/0153418 | A1* | 6/2009 | Park | H01Q 1/3275 343/702 |
| 2009/0284424 | A1* | 11/2009 | Yoon | H01Q 1/2266 343/702 |
| 2009/0311976 | A1 | 12/2009 | Vanderaa et al. | |
| 2010/0144285 | A1* | 6/2010 | Behzad | H04B 1/40 455/73 |
| 2011/0053526 | A1* | 3/2011 | Strei | H05K 5/064 455/90.3 |
| 2012/0028685 | A1 | 2/2012 | Van Wonterghem et al. | |
| 2012/0220252 | A1* | 8/2012 | Tseng | H04B 1/18 455/272 |
| 2012/0293015 | A1* | 11/2012 | Johnson | H03F 3/08 307/117 |
| 2013/0179697 | A1* | 7/2013 | Nicholas | G06F 1/263 713/300 |
| 2013/0288609 | A1* | 10/2013 | Mochizuki | H04W 24/00 455/67.11 |
| 2014/0088893 | A1* | 3/2014 | McGuire | G01D 21/00 702/58 |
| 2015/0002185 | A1* | 1/2015 | McGuire | G01R 31/40 324/764.01 |
| 2016/0147206 | A1* | 5/2016 | Neitzel | G05B 15/02 700/20 |
| 2016/0173163 | A1* | 6/2016 | Caruso | H04B 1/40 375/219 |

FOREIGN PATENT DOCUMENTS

| | | |
|---|---|---|
| JP | 2001-144388 A | 5/2001 |
| JP | 2003-308931 A | 10/2003 |
| JP | 2004-343265 A | 12/2004 |
| JP | 2006-86808 A | 3/2006 |
| JP | 2006114941 A | 4/2006 |
| JP | 2007-36988 A | 2/2007 |
| JP | 2009-146962 A | 7/2009 |
| JP | 2011-525330 A | 9/2011 |
| JP | 2013-504207 A | 2/2013 |
| WO | 2009/154744 A1 | 12/2009 |
| WO | 2011/028750 A1 | 3/2011 |
| WO | 2012129064 A1 | 9/2012 |

OTHER PUBLICATIONS

Translation Miyoshi Etsuo; Yamazaki Makoto (Inventors). Mitsubishi Electric Corp (Assignee). JP 2000004533 A. (Published Jan. 7, 2000).*
Translation Yaginuma Daisuke (Inventor). NEC Saitama Ltd (Assignee). JP 2004343265 A. (Published Dec. 2, 2004).*
International Search Report for PCT/JP2014/072891 dated Sep. 30, 2014 [PCT/ISA/210].
Written Opinion for PCT/JP2014/072891 dated Sep. 30, 2014 [PCT/ISA/210].

* cited by examiner

ANTENNA MODULE, WIRELESS DEVICE, AND FIELD DEVICE CONTROL SYSTEM

TECHNICAL FIELD

The present invention relates to an antenna module, a wireless device, and a field device control system.

This application is a National Stage of International Application No. PCT/JP2014/072891, filed on Sep. 1, 2014, which claims priority from Japanese Patent Application No. 2013-192339, filed on Sep. 17, 2013, the contents of which are incorporated herein by reference.

BACKGROUND ART

Conventionally, in a plant and a factory, a DCS (Distributed Control System) is established in order to implement an advanced automatic operation. In the distributed control system, field devices (a measurement device and a manipulation device) and a controller controlling the field devices are connected to each other through a network. Although most of the field device included in the distributed control system performs wire communications, recently there is a device (wireless field device) which performs wireless communications in conformity with an industrial wireless communication protocol such as ISA100.11a, WirelessHART (registered trademark), and so on.

An input/output part, a wireless communicator, and a control part are included in a housing of the wireless field device, and each part is operated by electric power supplied from a single power source. An input/output part performs measurement or operation of state quantity (for example, pressure, temperature, flow quantity, and so on) in an industrial process. The wireless communicator performs wireless communications in conformity with the industrial wireless communication protocol described above. The control part totally controls an operation of the wireless field device. Here, it is not necessary to connect the wireless field device to a communication line or a communication bus, different from the conventional field device. Since the wireless field device is basically installed in the plant independently, most of the wireless field device contains a battery as the single power source.

The following patent document 1 discloses that a wireless device is attached to the conventional field device which does not have a wireless communicator, and the wireless device is capable of operating the conventional field device as a wireless field device. Specifically, the wireless device disclosed in the following patent document 1 includes an interface, a wireless communicator, and a power source. The interface is connected to the conventional field device. The wireless communicator performs wireless communications. The power source supplies electric power to the conventional field device through the interface. In a case that a signal from the field device is input to the wireless device through the interface, the wireless device transmits the signal from the wireless communicator to a transmission destination (for example, a host controller). In a case that the wireless communicator receives a signal of which destination is the field device, the wireless device outputs the received signal to the field device through the interface.

CITATION LIST

Patent Literature

[Patent document 1] U.S. Patent Application Publication No. 2008/0211664

SUMMARY OF INVENTION

Technical Problem

By the way, most of the wireless devices disclosed in the patent document 1 are installed near the field device in order to omit a work of installing a pipeline (conduit) for protecting a connection line connected to the field device, and to suppress costs. However, since many pipelines and production facilities are installed, most of the field device is installed under an environment in which electric waves are easy to be reflected and blocked. For this reason, like the wireless device disclosed in the patent document 1, if the interface and the wireless communicator are integrated, there is a possibility that it is difficult to perform stable wireless communications.

Here, for example, in a case that an antenna can be dismounted from the wireless communicator by using an antenna cable, since a flexibility of an installation position of the antenna becomes high, it is thought that stable wireless communications can be performed. However, since a loss of a signal which transmits the antenna cable is great and the signal tends to be influenced by a noise, a length of the cable which is extensible is limited. For the reason, there is a problem that stable wireless communications are not necessarily realized.

Moreover, if spurious radiation such as high order harmonic is emitted as unnecessary radiation from the wireless device disclosed in the patent document 1, there is a possibility that the unnecessary radiation have a bad influence on other wireless devices disposed around it. For this reason, for example, it is necessary to cover the wireless communicator disposed in the wireless device with a shield (for example, metal box-shaped component) and to prevent the unnecessary radiation from being emitted to outside. If the circumference of the wireless communicator is completely covered with the shield, the unnecessary radiation can be reduced to about 0. However, since a wireless signal is not emitted also, it becomes impossible to perform the usual wireless communications through the antenna. Therefore, the wireless device disclosed in the patent document 1 has a problem that it is necessary to enable the usual wireless communications through the antenna and to suppress the unnecessary radiation as much as possible.

An aspect of the present invention is to provide an antenna module, a wireless device, and a field device control system, which can suppress the unnecessary radiation, and realize stable wireless communications irrespective of an installation position of the field device.

Solution to Problem

An antenna module according to one aspect of the present invention may include an antenna, a circuit configured to transmit and receive wireless signals by using the antenna, a housing that stores the circuit to cover circumference of the circuit, an antenna casing that stores the antenna to enable the antenna to transmit and receive wireless signals, and a first connector that is connected to the housing, the first connector being configured to input and output signals which are transmitted and received by the circuit.

In the antenna module according to one aspect of the present invention, the circuit may include a transmission/reception circuit configured to receive a signal transmitted from outside through the first connector, and transmit a signal to outside through the first connector, and a wireless signal processing circuit configured to transmit the signal, which is received by the transmission/reception circuit, from the antenna as a wireless signal, and process a wireless signal which is received by the antenna.

In the antenna module according to one aspect of the present invention, the first connector may include a first ground connector that is connected, through an external connector, to a signal ground which determines a reference potential of the circuit, and a second ground connector that is connected, through an external connector, to a frame ground which determines a potential of the housing.

In the antenna module according to one aspect of the present invention, the first connector may include a signal connector that is connected to a signal input/output terminal of the external connector, and a power source connector that is connected to a power source of the circuit through the external connector.

In the antenna module according to one aspect of the present invention, the housing may be made of material which blocks the wireless signals.

In the antenna module according to one aspect of the present invention, the antenna casing may be made of material which transmits the wireless signals.

In the antenna module according to one aspect of the present invention, a surface layer of the circuit may be coated with resin.

In the antenna module according to one aspect of the present invention, inside of the housing may be filled with resin.

In the antenna module according to one aspect of the present invention, a shortest distance L between a feeding point of the antenna and the housing in an axis direction of the housing may be represented by following formula (1), where θ is a 3 dB half-value angle of the antenna with reference to a plane which is perpendicular to an axis of the housing and includes the feeding point of the antenna, and φ is an external radius of the housing.

$$L = \varphi \times \tan \theta \quad (1)$$

In the antenna module according to one aspect of the present invention, the antenna may be a microstrip antenna formed on a substrate.

In the antenna module according to one aspect of the present invention, the housing may include a first housing disposed on a first end of the antenna module, and a second housing disposed on a second end which is an end opposite to the first end. The antenna and the antenna casing may be disposed between the first housing and the second housing.

In the antenna module according to one aspect of the present invention, the first connector may be disposed on both the first housing and the second housing.

A wireless device according to one aspect of the present invention may include a signal processing module configured to transmit signals to a field device and receive signals from the field device, and an antenna module configured to transmit signals to the signal processing module and receive signals from the signal processing module. The antenna module may include an antenna, a circuit configured to transmit and receive wireless signals by using the antenna, a housing that stores the circuit to cover circumference of the circuit, an antenna casing that stores the antenna an antenna casing that stores the antenna to enable the antenna to transmit and receive wireless signals, and a first connector that is connected to the housing, the first connector being configured to input and output signals which are transmitted and received by the circuit.

In the wireless device according to one aspect of the present invention, the signal processing module may include a second connector configured to transmit signals to the first connector of the antenna module and receive signals from the first connector of the antenna module.

The wireless device according to one aspect of the present invention may further include a cable that connects between the first connector and the second connector.

In the wireless device according to one aspect of the present invention, the cable may include a ground line that is connected to a signal ground which determines a reference potential of the circuit disposed in the antenna module, a signal line that is connected to the circuit, and in which signals are transmitted to the field device and received from the field device, a power source line that is connected to a power source of the circuit, and a shield that is disposed around the ground line, the signal line, and the power source line, the shield being connected to a frame ground which determines a potential of the housing of the antenna module.

A field device control system according to one aspect of the present invention may include a field device, a signal processing module configured to transmit signals to the field device and receive signals from the field device, and an antenna module configured to transmit signals to the signal processing module and receive signals from the signal processing module. The antenna module may include an antenna, a circuit configured to transmit and receive wireless signals by using the antenna, a housing that stores the circuit to cover circumference of the circuit, an antenna casing that stores the antenna to enable the antenna to transmit and receive wireless signals, and a first connector that is connected to the housing, the first connector being configured to input and output signals which are transmitted and received by the circuit.

In the field device control system according to one aspect of the present invention, the signal processing module may include a second connector configured to transmit signals to the first connector of the antenna module and receive signals from the first connector of the antenna module.

The field device control system according to one aspect of the present invention may further include a cable that connects between the first connector and the second connector.

In the field device control system according to one aspect of the present invention, the cable may include a ground line that is connected to a signal ground which determines a reference potential of the circuit disposed in the antenna module, a signal line that is connected to the circuit, and in which signals are transmitted to the field device and received from the field device, a power source line that is connected to a power source of the circuit, and a shield that is disposed around the ground line, the signal line, and the power source line, the shield being connected to a frame ground which determines a potential of the housing of the antenna module.

Advantageous Effects of Invention

According to an aspect of the present invention, in the wireless device, a signal processing module which communicates with the field device, and an antenna module which performs wireless communications are disposed independently. Signals, which are transmitted and received between the signal processing module and the antenna module, are transmitted and received through a connector or a cable. In the antenna module, circumference of the circuit which deals with wireless signals is covered with a housing, and an antenna is stored in an antenna casing so that the wireless signals can be transmitted and received. For this reason, there is an effect that the unnecessary radiation can be suppressed, and the stable wireless communications can be realized irrespective of the installation position of the field device.

DESCRIPTION OF EMBODIMENTS

An antenna module, a wireless device, and a field device control system in embodiments of the present invention will be described in detail below with reference to drawings.

First Embodiment

Figure 1:
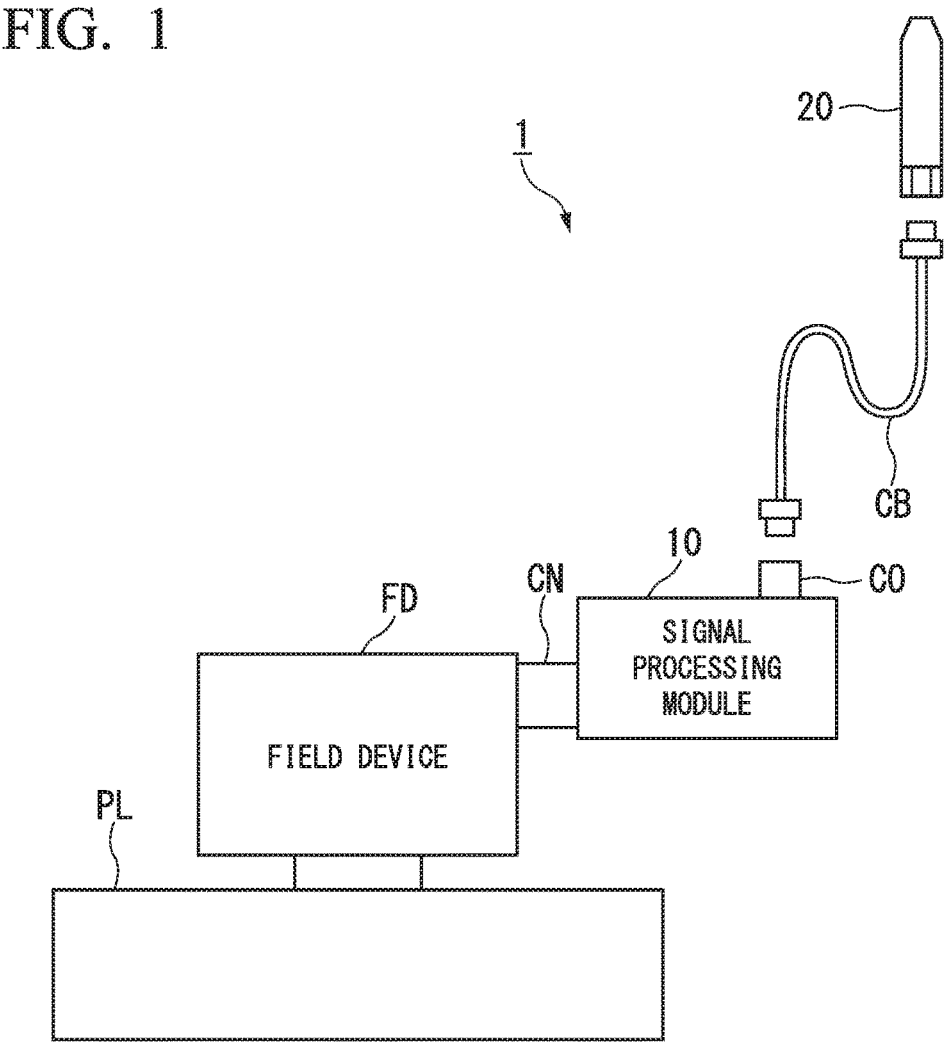
FIG. 1 is a drawing illustrating an example of the wireless device in a use state in a first embodiment of the present invention.

FIG. 1 is a drawing illustrating an example of the wireless device in a use state in a first embodiment of the present invention. As shown in FIG. 1, the wireless device 1 of the present embodiment is equipped with a signal processing module 10 and an antenna module 20. The wireless device 1 is connected to the field device FD which is mounted on a pipeline PL. The wireless device 1 transmits a wireless signal which is generated based on a signal (first signal) from the field device FD, and receives a signal (second signal) which is transmitted wirelessly and to be transmitted to the field device FD. The wireless device 1 performs wireless communications in conformity with ISA100.11a.

Here, the field device FD is such as a sensor device (for example, a flowmeter and a temperature sensor), a valve device (for example, a flow control valve and an on-off valve), an actuator device (for example, a fan and a motor), an imaging device (for example, a camera and a video camera for recording circumstances and objects in the plant), a sound device (for example, a microphone collecting abnormal noise in the plant, and a speaker generating alarm sound), a position detection device outputting a position information of each device, and other devices installed in a field of the plant. Moreover, for example, the pipeline PL is a pipeline in which fluid such as crude oil and gas flows. In the present embodiment, in order to understand easily, the field device FD is a sensor device which measures flow quantity of the fluid which flows in the pipeline PL.

The field device FD is connected to a network and a transmission line (for example, a transmission line used for transmitting a signal of "4-20 mA") which are established in the field of the plant. The field device FD receives electric power from the network, and field device FD is capable of communicating through the network. Specifically, the field device FD is capable of communicate by using a general-purpose communication protocol for industrial process such as HART (registered trademark), BRAIN, Foundation Field bus (registered trademark), PROFIBUS (registered trademark), DeviceNet (registered trademark), CC-Link (registered trademark), and EtherNet/IP (registered trademark).

The signal processing module 10 is connected to the field device FD and the antenna module 20. The signal processing module 10 performs signal processing, such as communication processing with respect to the field device FD, communication processing with respect to the antenna module 20, and conversion processing of a communication protocol. Also, the signal processing module 10 is, so to speak, a relay module which relays various types of signals transmitted and received between the field device FD and the antenna module 20.

Specifically, the signal processing module 10 is connected to the field device FD by a connector CN. The signal processing module 10 communicates with the field device FD through the connector CN (analog communication or digital communication). That is, in order to enable the communication with the field device FD, the same communication protocol as the communication protocol implemented in the field device FD is implemented in the signal processing module 10.

Moreover, the signal processing module 10 is connected to the antenna module 20 through a cable CB. The signal processing module 10 communicates with the antenna module 20 through the cable CB (for example, serial communication such as RS-422). In FIG. 1, although an example in which the signal processing module 10 and the antenna module 20 are connected to each other by the cable CB is shown, the antenna module 20 can be directly connected to the signal processing module 10, without using the cable CB. That is, a connector C0 mounted on the signal processing module 10 can be connected to the cable CB, and can be also connected to the antenna module 20.

In a case that the signal processing module 10 and the antenna module 20 are connected to each other by using the cable CB, a flexibility of an installation position of the antenna module 20 can be improved. On the other hand, in a case that the antenna module 20 is directly connected to the signal processing module 10 without using the cable CB, the wireless device 1 can be used like the conventional wireless device to which the antenna is fixed. Although details will be described later, a multi-core shielded cable which has a power source line, a signal line, and a ground line is used as the cable CB.

Figure 4:
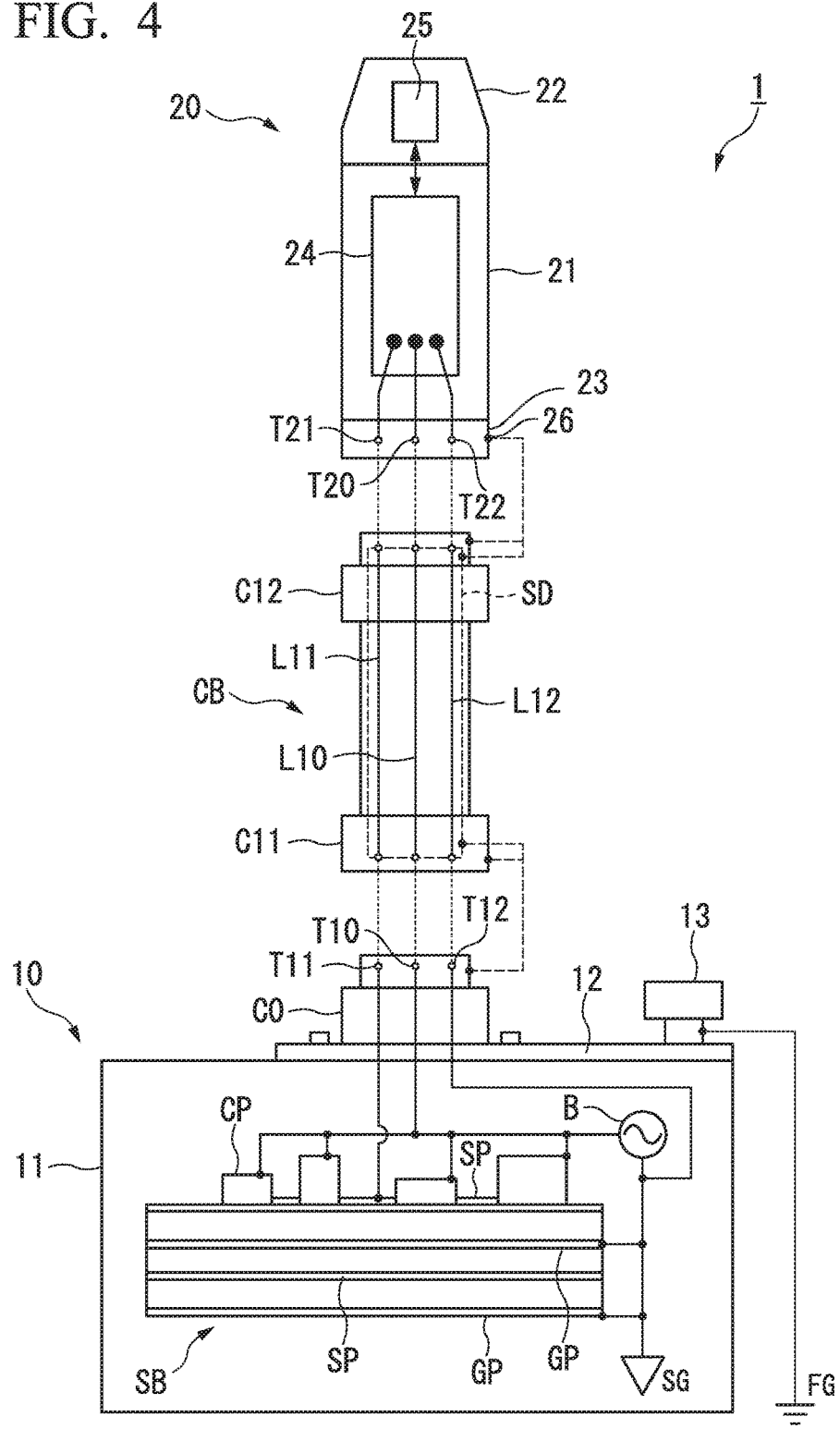
FIG. 4 is a drawing for describing a connection state of the antenna module and the signal processing module which are included in the wireless device in the first embodiment of the present invention.

The signal processing module 10 is equipped with a power source B (refer to FIG. 4). The signal processing module 10 supplies electric power to the antenna module 20 through the cable CB. As the power source B, a battery (for example, a primary battery and a secondary battery with very little self-discharge, such as a thionyl chloride lithium battery), a fuel battery, a capacitor, or a power generation circuit that performs environmental power generation (so called, energy harvest such as a solar cell) can be used. The power source B may be built in the signal processing module 10, and may be disposed outside the signal processing module 10.

The antenna module 20 is equipped with an antenna 25 (refer to FIG. 2) which transmits and receives wireless signals. The antenna module 20 communicates with the signal processing module 10, and the antenna module 20 transmits and receives wireless signals through the antenna 25. Specifically, the antenna module 20 generates a wireless signal based on the signal transmitted from the signal processing module 10, and transmits the generated wireless signal from the antenna 25. The antenna module 20 processes a wireless signal received by the antenna 25, and transmits the processed signal toward the signal processing module 10.

Figure 2:
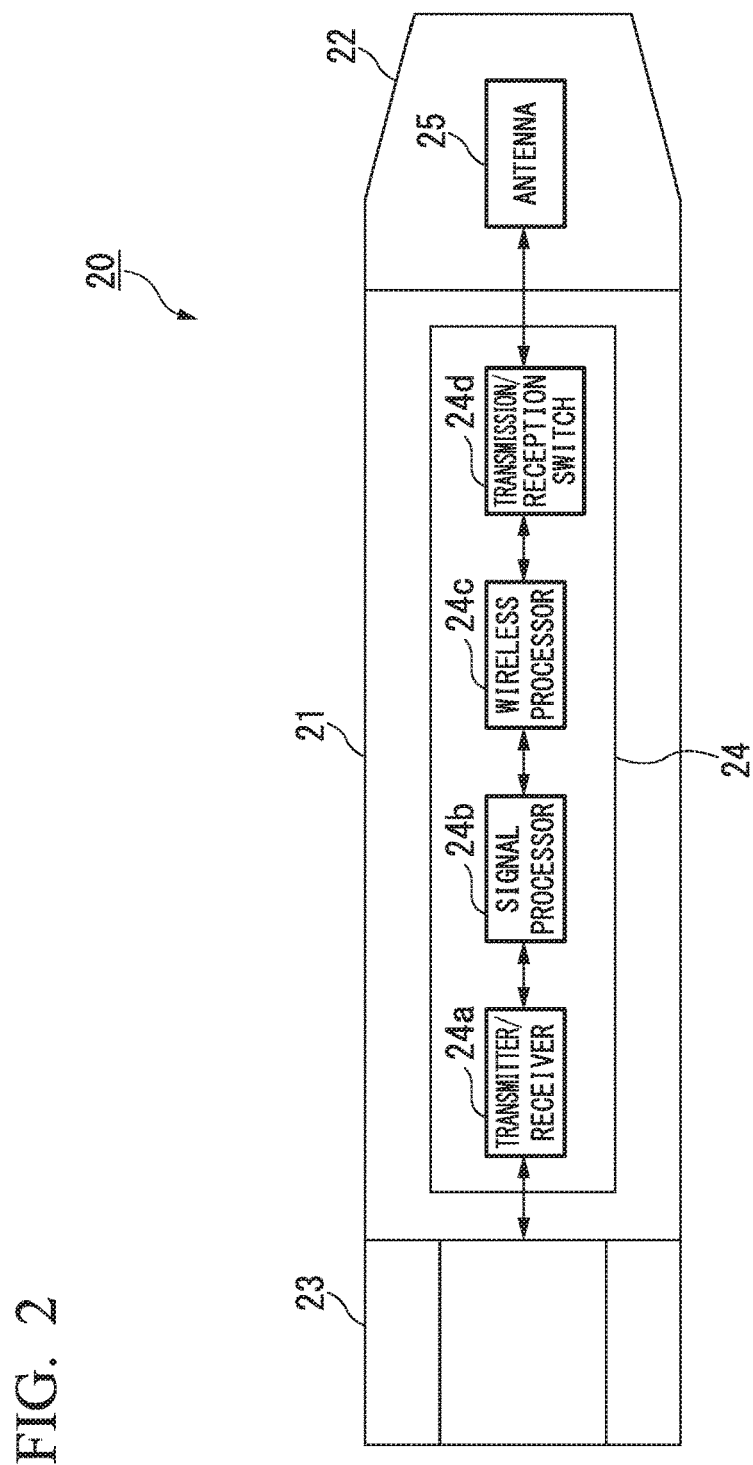
FIG. 2 is a block diagram illustrating a main configuration of the antenna module in the first embodiment of the present invention.

FIG. 2 is a block diagram illustrating a main configuration of the antenna module in the first embodiment of the present invention. As shown in FIG. 2, the antenna module 20 is equipped with a housing 21, an antenna cap 22 (antenna casing), a connector 23, a circuit 24, and an antenna 25. An outer shape of the antenna module 20 is a columnar shape or a polygonal columnar shape (for example, a square pillar shape). Since the outer shape of the antenna module 20 is a pillar shape, the antenna module 20 can be directly connected to the signal processing module 10 like the antenna (a sleeve antenna or a whip antenna) mounted on the conventional wireless device.

The housing 21 is a component which is tube-shaped (cylindrical or polygonal cylindrical) and made of material which blocks wireless signals, for example, metal with high rigidity, such as high rigidity aluminum. The housing 21 stores the circuit 24 so that the circumference of the circuit 24 can be covered. Here, the circumference of the circuit 24 is covered with the metal housing 21, in order to suppress that the unnecessary radiation (for example, spurious radiation such as high order harmonics), which occurs in the circuit 24, leaks to outside the antenna module 20, as much as possible, and to prevent from having a bad influence on other wireless devices disposed around it.

The inside of the housing 21 is filled with resin in order to meet an intrinsically safe explosion-proof standard. That is, the circuit 24 stored in the housing 21 is sealed by the resin with which the inside of the housing 21 is filled. Here, if the inside of the housing 21 is filled with resin, cost and weight of the antenna module 20 will increase. For this reason, the inside of the housing 21 may be partially filled with resin so that only a surface of the circuit 24 can be coated with resin, without filling the inside of the housing 21 with resin.

The antenna cap 22 stores the antenna 25. The antenna cap 22 is a component made of resin in which wireless signals transmit. The antenna cap 22 is the same outside diameter as the housing 21. The antenna cap 22 is mounted on an end of the housing 21. The antenna cap 22 stores the antenna 25 so that the antenna 25 is arranged outside the housing 21 (so that the circumference of the antenna 25 is not covered by the housing 21). This is so that a wireless signal transmitted from the antenna 25 or a wireless signal received by the antenna 25 is not blocked by the housing 21, and the antenna 25 can transmit and receive wireless signals. The antenna cap 22 may be made of material in which wireless signals transmit, other than resin.

The connector 23 is a connector which connects the antenna module 20 to the cable CB or the signal processing module 10. The connector 23 is connected to another end of the housing 21. Specifically, the connector 23 is screwed or fitted to an external connector (a connector disposed at an end of the cable CB, or a connector disposed on the signal processing module 10), so that the antenna module 20 is fixed and electrically connected to the cable CB or the signal processing module 10.

The connector 23 is equipped with connection terminals T20 to T22 (refer to FIG. 4) connected to the circuit 24. Through the connection terminals T20 to T22, electric power is received from the signal processing module 10, and signals which are transmitted and received between the antenna module 20 and the signal processing module 10 are input and output. Since it is thought that the antenna module 20 is installed outdoors, it is desirable that the connector 23 meets waterproof-dustproof standards, such as IP (International Protection) standard and NEMA (National Electrical Manufacturers Association) standard. Details of an electrical connection between the antenna module 20 and the external connector will be described later.

The circuit 24 is equipped with a transmitter/receiver 24a (transmission/reception circuit), a signal processor 24b (wireless signal processing circuit), a wireless processor 24c (wireless signal processing circuit), and a transmission/reception switch 24d. The circuit 24 of the configuration generates a wireless signal based on a signal transmitted from the signal processing module 10. The circuit 24 transmits the generated wireless signal from the antenna 25, and the circuit 24 processes a wireless signal received by the antenna 25 and transmits it toward the signal processing module 10.

The transmitter/receiver 24a communicates with the signal processing module 10 through the cable CB (for example, serial communications, such as RS-422). Specifically, the transmitter/receiver 24a receives a signal which is transmitted from the signal processing module 10 through the connector 23, and outputs it to the signal processor 24b. Moreover, the transmitter/receiver 24a transmits, through the connector 23, a signal which is output from the signal processor 24b (a signal which is to be transmitted to the signal processing module 10).

The signal processor 24b performs predetermined signal processing with respect to the signal from the transmitter/receiver 24a or the signal from the wireless processor 24c. Specifically, the signal processor 24b performs synchronous processing, data conversion processing, communication protocol conversion processing, encryption processing, and modulation processing, with respect to the signal from the transmitter/receiver 24a. Moreover, the signal processor 24b performs demodulation processing, decoding processing, communication protocol conversion processing, data conversion processing, and synchronous processing, with respect to the signal from the wireless processor 24c. Moreover, the signal processor 24b also performs control of switching the transmission/reception switch 24d.

The wireless processor 24c generates a wireless signal which is to be transmitted from the antenna 25 by using the signal from the signal processor 24b, or the wireless processor 24c receives a wireless signal from the antenna 25. Specifically, the wireless processor 24c performs synchronous processing, encryption processing, and frequency conversion processing, with respect to the signal from the signal processor 24b. Moreover, the wireless processor 24c performs frequency conversion processing, composite processing, and synchronous processing, with respect to the wireless signal from the antenna 25.

The transmission/reception switch 24d switches transmission and reception of a wireless signal under control of the signal processor 24b. Specifically, when a wireless signal is to be transmitted, the transmission/reception switch 24d switches a route of a wireless signal so that the wireless signal generated by the wireless processor 24c is input into the antenna 25. Moreover, when a wireless signal is to be received, the transmission/reception switch 24d switches the route of a wireless signal so that the wireless signal received by the antenna 25 is input into the wireless processor 24c.

Figure 3:
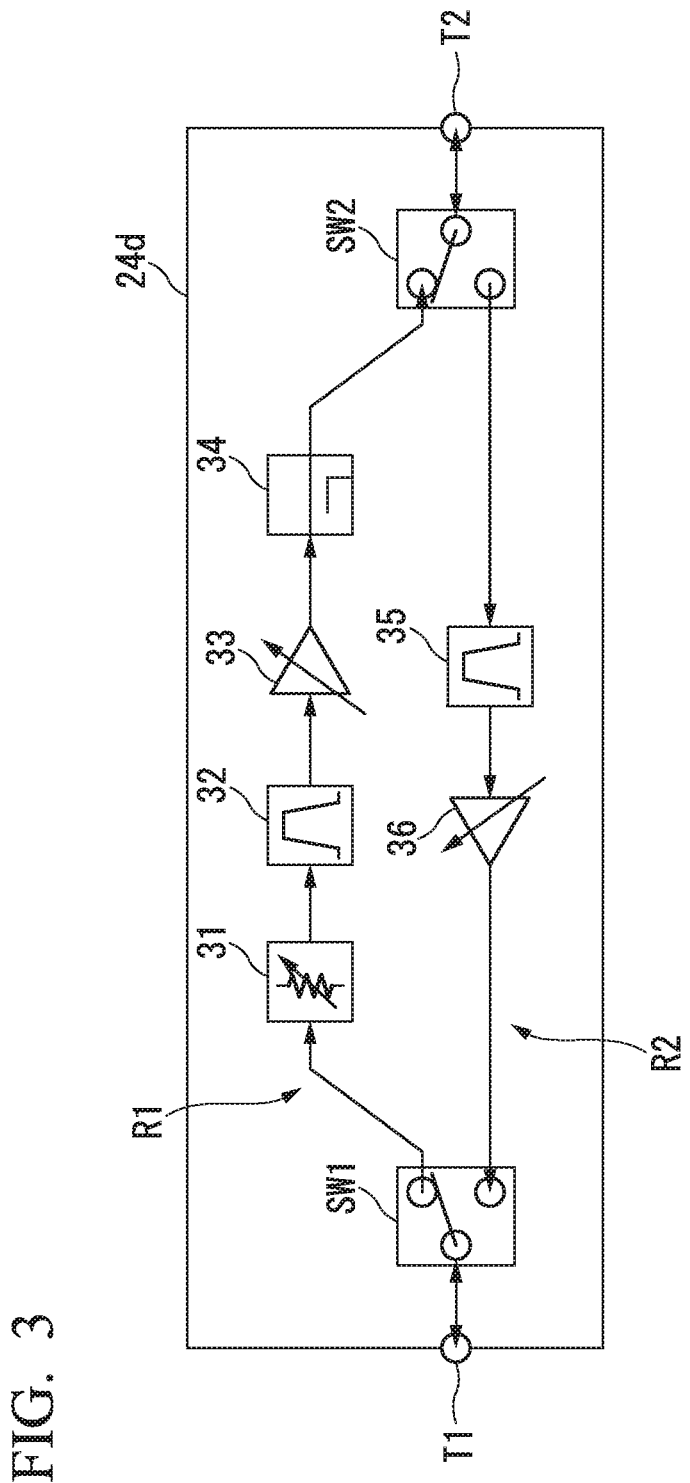
FIG. 3 is a block diagram illustrating configuration of the transmission/reception switch disposed in the antenna module in the first embodiment of the present invention.

FIG. 3 is a block diagram illustrating configuration of the transmission/reception switch disposed in the antenna module in the first embodiment of the present invention. As shown in FIG. 3, the transmission/reception switch 24d is equipped with a switch SW1, a switch SW2, an output adjuster 31, a filter 32, a high frequency amplifier 33, an output level detector 34, a bandpass filter 35, and an amplifier 36. Out of them, the output adjuster 31, the filter 32, the high frequency amplifier 33, and the output level detector 34 are disposed on a transmission route R1, and the bandpass filter 35 and the amplifier 36 are disposed on a reception route R2. The transmission route R1 is a route for inputting, into the antenna 25, the wireless signal generated by the wireless processor 24c. Moreover, the reception route R2 is a route for inputting, into the wireless processor 24c, the wireless signal received by the antenna 25.

Under control of the signal processor 24b, the switch SW1 and the switch SW2 switch the route, which is between an input/output end T1 connected to the wireless processor 24c and an input/output end T2 connected to the antenna 25, to whether the transmission route R1 or the reception route R2. The output adjuster 31 is controlled by the signal processor 24b, and performs output adjustment of the wireless signal which is input from the input/output end T1 and passed through the switch SW1. The filter 32 removes spurious radiation, such as an image signal and high order harmonics, superimposed on the wireless signal which is from the output adjuster 31.

The high frequency amplifier 33 amplifies the wireless signal which passed through the filter 32 with a predetermined amplification factor. The amplification factor of the high frequency amplifier 33 is controlled by the signal processor 24b. The output level detector 34 detects an output level of the wireless signal which was amplified by the high frequency amplifier 33. A detection result of the output level detector 34 is output to the signal processor 24b, and used when the signal processor 24b controls an extinction ratio or an amplification factor of the output adjuster 31 or the high frequency amplifier 33.

Only signal component of the wireless signal, which was input from the input/output end T2 and passed through the switch SW2, can pass through the bandpass filter 35. Thereby, the bandpass filter 35 removes noise component which is superimposed on the wireless signal. The amplifier 36 amplifies the wireless signal which passed through the bandpass filter 35 with a predetermined amplification factor. The amplification factor of the amplifier 36 is controlled by the signal processor 24b like the amplification factor of the high frequency amplifier 33.

The antenna 25 is connected to the input/output end T2 of the transmission/reception switch 24d. The antenna 25 transmits a wireless signal which is from the transmission/reception switch 24d. Moreover, the antenna 25 receives a wireless signal which is transmitted to the antenna 25, and outputs it to the transmission/reception switch 24d. The antenna 25 may be a small antenna stored in the antenna cap 22. For example, a microstrip antenna formed on a substrate may be used as the antenna 25.

FIG. 4 is a drawing for describing a connection state of the antenna module and the signal processing module which are included in the wireless device in the first embodiment of the present invention. As shown in FIG. 4, for example, the signal processing module 10 is made of metal with high rigidity, such as high rigidity aluminum, or resin. The signal processing module 10 is equipped with a hollow box-shaped housing 11 which stores a substrate SB. A connector pedestal 12 made of metal is attached to an upper surface of the housing 11. The connector C0 (refer to FIG. 1) and an earth terminal 13 connected to a frame ground FG are disposed on the connector pedestal 12. That is, in the signal processing module 10, at least the connector pedestal 12, the earth terminal 13, and a shell (metal part of outer circumference) of the connector C0 are the same potential as the frame ground FG.

The substrate SB stored in the housing 11 is a multilayer board in which signal patterns SP and ground patterns GP are formed. Two or more semiconductor chips CP, which perform the signal processing described above (communication processing and communication protocol conversion processing between the field device FD and the antenna module 20), are mounted on the substrate SB. The power source B, which supplies electric power for operating the signal processing module 10 and the antenna module 20, is disposed in the housing 1.

One end of the power source B is connected to the semiconductor chips CP mounted on the substrate SB. The other end of the power source B is connected to a signal ground SG configured in the housing 11. The signal ground SG specifies a reference potential in the signal processing module 10, and specifies a reference potential of the circuit 24 disposed in the antenna module 20. The ground pattern GP formed in the substrate SB is also connected to the signal ground SG. A power source connection terminal T10, a signal connection terminal T11, and a ground connection terminal T12 are disposed in the connector C0. The power source connection terminal T10 is connected to one end of the power source B. The signal connection terminal T11 is connected to the signal pattern SP. The ground connection terminal T12 is connected to the signal ground SG.

The cable CB is a multi-core shielded cable which is equipped with a power source line L10, a signal line L11, a ground line L12, and a shield SD. Here, the power source line L10, the signal line L11, and the ground line L12 are core lines. The shield SD is such as a braided wire and aluminum foil which are disposed in the circumference of these core lines. The shield SD is electrically connected to the shell (metal part of outer circumference) of the connectors C11 and C12 disposed in the both ends of the cable CB.

A power source connection terminal T20 (power source connector), a signal connection terminal T21 (signal connection part), and a ground connection terminal T22 (first ground connector) are disposed in the connector 23 of the antenna module 20. The power source connection terminal T20 is connected to a power source input end of the circuit 24. The signal connection terminal T21 is connected to a signal input/output end (terminal connected to the transmitter/receiver 24a shown in FIG. 2) of the circuit 24. The ground connection terminal T22 is connected to a ground end of the circuit 24. The shell 26 (metal part of outer circumference: second ground connector) of the connector 23 is connected to the housing 21.

If the connector C11 of the cable CB is connected to the connector C0 of the signal processing module 10, the power source line L0 is connected to the power source connection terminal T10, the signal line L11 is connected to the signal connection terminal T11, and the ground line L12 is connected to the ground connection terminal T12. Moreover, the shield SD is connected to the frame ground FG through the shell of the connector C11 of the cable CB and the shell of the connector C0.

If the connector C12 of the cable CB is connected to the connector 23 of the antenna module 20, the power source line L10 is connected to the power source connection terminal T20, the signal line L11 is connected to the signal connection terminal T21, and the ground line L12 is connected to the ground connection terminal T22. Moreover, the shield SD is connected to the housing 21 through the shell of the connector C12 and the shell of the connector 23.

Therefore, the power source connection terminal T20 of the antenna module 20 is connected to the power source connection terminal T10 of the connector C0 through the power source line L10 of the cable CB. Thereby, the circuit 24 and one end of the power source B are electrically connected to each other. The signal connection terminal T21 of the antenna module 20 is connected to the signal connection terminal T11 of the connector C0 through the signal line L11 of the cable CB. Thereby, the circuit 24 and the signal pattern SP formed in the substrate SB are electrically connected to each other.

The ground connection terminal T22 of the antenna module 20 is connected to the ground connection terminal T12 of the connector C0 through the ground line L12 of the cable CB. Thereby, the circuit 24 is connected to the signal ground SG. The shell 26 of the connector 23 of the antenna module 20 is connected to the shell of the connector C0 through the shell of the connector C12 of the cable CB, the shield SD, and the shell of the connector C11. Thereby, the housing 21 of the antenna module 20 is connected to the frame ground FG.

In this way, the signal processing module 10 and the antenna module 20 are connected to each other by the cable CB, the circumference of the signal route from the connector C0 of the signal processing module 10 to the circuit 24 of the antenna module 20 is covered by the metallic component connected to the frame ground FG. The metallic component is the shell of the connector C0, the shell and the shield SD of the connectors C11 and C12 of the cable CB, the shell of the connector 23 of the antenna module 20, and the housing 21. For this reason, the unnecessary radiation (for example, spurious radiation such as high order harmonics), which occurs in the circuit 24, can be suppressed, and the bad influence of external noise can be reduced.

In a case that the antenna module 20 is directly connected to the connector C0 of the signal processing module 10, the power source connection terminal T20, the signal connection terminal T21, and the ground connection terminal T22 of the antenna module 20 are directly connected to the power source connection terminal T10, the signal connection terminal T11, and the ground connection terminal T12 of the connector C0, respectively. Moreover, the shell of the connector 23 of the antenna module 20 is directly connected to the shell of the connector C0.

Figure 5A:
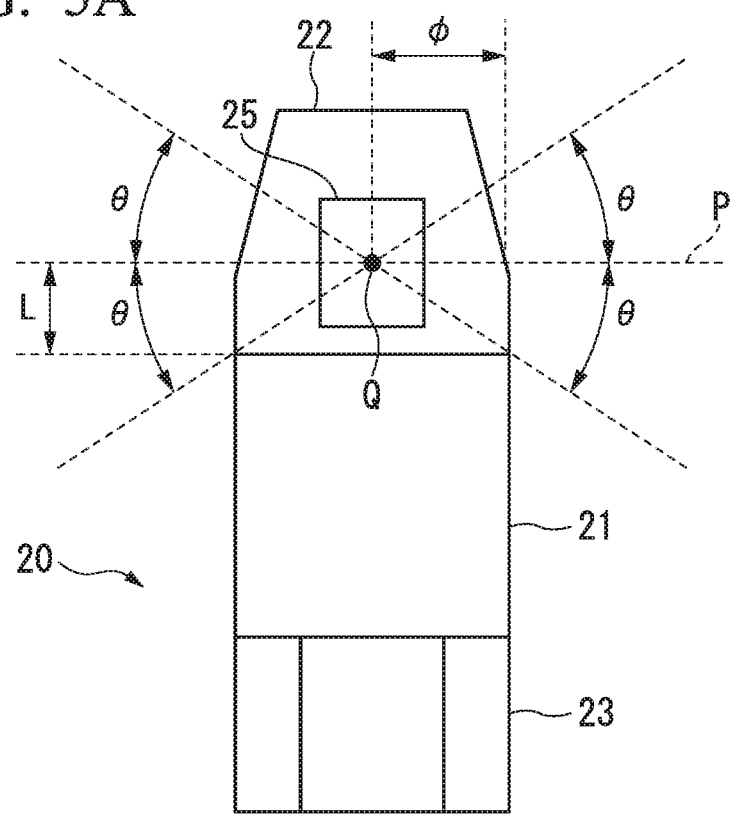
FIG. 5A is a drawing for describing the attachment position of the antenna of the antenna module in the first embodiment of the present invention.
Figure 5B:
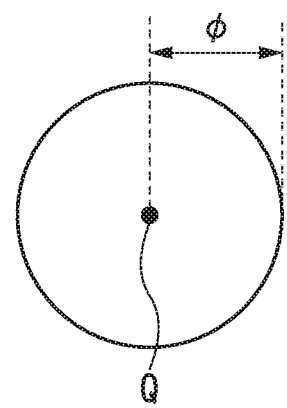
FIG. 5B is a drawing for describing the attachment position of the antenna of the antenna module in the first embodiment of the present invention.
Figure 5C:
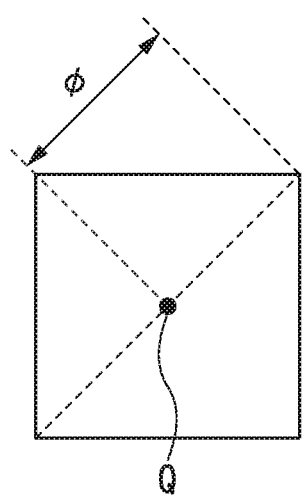
FIG. 5C is a drawing for describing the attachment position of the antenna of the antenna module in the first embodiment of the present invention.

Next, an attachment position of the antenna 25 included in the antenna module 20 will be described. FIG. 5A to FIG. 5C are drawings for describing the attachment position of the antenna of the antenna module in the first embodiment of the present invention. Hereinafter, in order to describe simply, an example that the antenna 25 is non-directional in a plane (reference plane P shown in FIG. 5A) which intersects perpendicularly with an axis of the housing 21 will be described.

As shown in FIG. 5A, θ is a 3 dB half-value angle of the antenna 25 with reference to the reference plane P which is perpendicular to the axis of the housing 21 and includes a feeding point Q of the antenna, and φ is an external radius of the housing 21. The antenna 25 is attached to the position where a distance between the feeding point Q and the housing 21 in the axis direction of the housing 21 becomes the shortest distance L represented by the following formula (2).

$$L = \varphi \times \tan\theta \times \alpha \quad (2)$$

Here, in a case that an outer shape of the housing 21 is a columnar shape, as shown in FIG. 5B, the external radius φ of the housing is a distance from the feeding point Q positioned on the axis of the housing 21 to the outer circumference of the housing 21. In contrast, in a case that the outer shape of the housing 21 is a square pillar shape, as shown in FIG. 5C, the external radius φ of the housing 21 is a half-length of a diagonal line which passes through the feeding point Q positioned on the axis of the housing 21.

The variable α on a right side of the formula (2) is a constant number representing a margin in consideration of mechanical manufacturing error or the like. That is, the variable α is defined so that the wireless signal radiated from the antenna 25 is hardly influenced by the housing 21 (so that it is not blocked by the housing 21). Specifically, the variable α is determined in consideration of an accuracy of a radiation angle of the wireless signal radiated from the antenna 25 (angle with respect to the reference plane P), a manufacturing accuracy of the housing 21, and a manufacturing accuracy of the circuit 24. For example, a value "1.05" is set as the variable α. In a case of not considering the margin (in a case that α=1), the formula (2) becomes equal to the formula (1).

The antenna 25 is attached to the position described above in order to suppress the unnecessary radiation as much as possible, without affecting a performance of the antenna 25. That is, if the antenna 25 is attached to a position where a distance from the feeding point Q to the housing 21 is shorter than the shortest distance L, a wireless signal is blocked by the housing 21 made of metal, and the performance of the antenna 25 is decreased. On the other hand, if the antenna 25 is attached to a position where the distance from the feeding point Q to the housing 21 is longer than the shortest distance L, the unnecessary radiation is increased. For this reason, the antenna is attached to the position described above. The antenna 25 may be attached to a position where the distance from the feeding point Q to the housing 21 is slightly longer than the shortest distance L, as long as the unnecessary radiation is permissible.

Next, an operation of the wireless device 1 including the configuration described above will be described. Hereinafter, an operation (transmitting operation) of generating a wireless signal based on the signal from the field device FD and transmitting it, and an operation (receiving operation) of receiving a signal which is wirelessly transmitted and to be transmitted to the field device FD, will be described in order.

<Transmitting Operation>

If a signal is output from the field device FD, the signal is input into the signal processing module 10 through the connector CN. The signal input into the signal processing module 10 is transmitted toward the antenna module 20 by the communication performed between the signal processing module 10 and the antenna module 20, after signal processing such as communication protocol conversion processing is performed. The signal transmitted from the signal processing module 10 passes through, in order, the signal connection terminal T11 of the connector C0, the signal line L11 of the cable CB, and the signal connection terminal T21 of the antenna module 20, which are shown in FIG. 4, and the signal is input into the circuit 24 of the antenna module 20.

The signal input into the circuit 24 is received by the transmitter/receiver 24a shown in FIG. 2, and is output to the signal processor 24b. The signal processor 24b performs signal processing, such as synchronous processing, data conversion processing, communication protocol conversion processing, encryption processing, and modulation processing, with respect to the signal output from the transmitter/receiver 24a. The signal to which the signal processor 24b performed the signal processing is output to the wireless processor 24c. The wireless processor 24c performs processing, such as synchronous processing, encryption processing, and frequency conversion processing, by using the signal from the signal processor 24b. A wireless signal is generated by the processing.

The wireless signal generated by the wireless processor 24c is input into the input/output end T1 of the transmission/reception switch 24d shown in FIG. 3. After the wireless signal passes through, in order, the output adjuster 31, the filter 32, the high frequency amplifier 33, and the output level detector 34, which are disposed on the transmission route R1, the wireless signal is output from the input/output end T2. At a time of the transmitting operation, the signal processor 24b controls to switch the switch SW1 and the switch SW2 so that the route between the input/output end T1 and the input/output end T2 may turn into the transmission route R1. The wireless signal output from the input/output end T2 is input into the feeding point Q of the antenna 25. Thereby, the wireless signal can be transmitted from the antenna 25.

<Receiving Operation>

If a wireless signal is received by the antenna 25, the wireless signal is input into the input/output end T2 of the transmission/reception switch 24d shown in FIG. 3. After the wireless signal passes through, in order, the bandpass filter 35 and the amplifier 36, which are disposed on the reception route R2, the wireless signal is output from the input/output end T1. At the time of the reception operation, the signal processor 24b controls to switch the switch SW1 and the switch SW2 so that the route between the input/output end T1 and the input/output end T2 may turn into the transmission route R2.

The wireless signal output from the input/output end T1 is input into the wireless processor 24c shown in FIG. 2. The wireless processor 24c performs processing, such as frequency conversion processing, composite processing, and synchronous processing, with respect to the signal output from the transmission/reception switch 24d. The signal output from the wireless processor 24c is input into the signal processor 24b. The signal processor 24b performs signal processing, such as demodulation processing, decoding processing, communication protocol conversion processing, data conversion processing, and synchronous processing, with respect to the signal output from the wireless processor 24c. The signal to which the signal processor 24b performed signal processing is output to the transmitter/receiver 24a. The transmitter/receiver 24a transmits the signal, which was output from the signal processor 24b, toward the signal processing module 10 by communicating with signal processing module 10.

The signal transmitted from the antenna module 20 passes through, in order, the signal connection terminal T21 of the connector 23, the signal line L11 of the cable CB, and the signal connection terminal T11 of the connector C0, which are shown in FIG. 4, and the signal is input into the signal processing module 10. The signal input into the signal processing module 10 is transmitted toward the field device FD through the connector CN, after signal processing such as communication protocol conversion processing is performed.

As described above, in the wireless device 1 of the embodiment, the signal processing module 10 which communicates with the field device FD, and the antenna module 20 which performs wireless communications are disposed independently. The signals, which are transmitted and received between the signal processing module 10 and the antenna module 20, are transmitted and received through the cable CB. In the antenna module 20, the circumference of the circuit 24 which deals with wireless signals is covered with the housing 21, and the antenna is stored in the antenna cap 22 so that the wireless signals can be transmitted and received.

Thereby, since the flexibility of the installation position of the antenna module 20 can be improved, if the antenna module 20 is installed in a place where a radio wave state is good, stable wireless communications can be performed. Moreover, since most of the unnecessary radiation emitted from the circuit 24 which deals with wireless signals of the antenna module 20 is blocked by the housing 21, the unnecessary radiation can be suppressed as much as possible. Thus, in the present embodiment, the unnecessary radiation can be suppressed, and stable wireless communications can be realized irrespective of the installation position of the field device.

Second Embodiment

Figure 6:
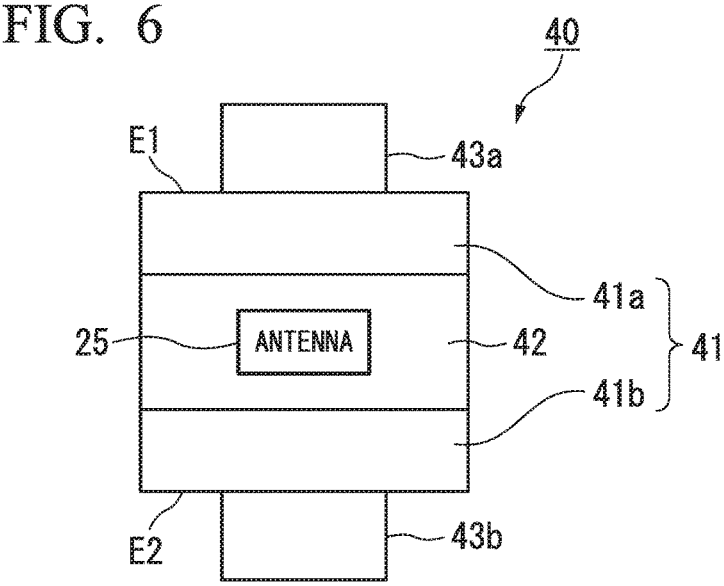
FIG. 6 is a drawing illustrating typically the antenna module in a second embodiment of the present invention.

FIG. 6 is a drawing illustrating typically the antenna module in a second embodiment of the present invention. As shown in FIG. 6, the antenna module 40 of the present embodiment is equipped with a housing 41, an antenna casing 42, a connector 43a, a connector 43b, and the antenna 25. Like the antenna module 20, the antenna module 40 receives a signal transmitted from the signal processing module 10, generates a wireless signal based on the received signal, and transmits the generated wireless signal from the antenna 25. Moreover, the antenna module 40 processes a wireless signal received by the antenna 25, and the antenna module 40 transmits the processed signal toward the signal processing module 10.

In the antenna module 20 of the first embodiment, the antenna 25 is stored in the antenna cap 22 disposed in the end of the housing 21. On the other hand, in the antenna module 40 of the present embodiment, the antenna 25 is stored in the antenna casing 42 disposed between both ends of the housing 41 (between the end E1 and the end E2), and the antenna 25 is equipped with two connectors 43a and 43b.

The housing 41 has two housings 41a and 41b. These housings 41a and 41b are components which are tube-shaped (cylindrical or polygonal cylindrical) and made of material, for example, metal with high rigidity, such as high rigidity aluminum. The housings 41a and 41b store a circuit (not shown in the drawing) so that the circumference of the circuit can be covered. The circuit may be stored in either of the housings 41a and 41b, and may be stored in both sides of the housings 41a and 41b. In order to meet an intrinsically safe explosion-proof standard, the inside of the housings 41a and 41b may be filled with resin.

The antenna casing 42 is a component made of resin, which is formed to be circular ring-shaped or polygonal ring-shaped. The antenna casing 42 is the same outside diameter as the housings 41a and 41b. The antenna casing 42 is arranged between the housing 41a and the housing 41b. The antenna casing 42 stores the antenna 25. Like the antenna cap 22 shown in FIG. 2, the antenna casing 42 stores the antenna 25 so that the antenna 25 is disposed outside the housing 41 (so that the circumference of the antenna 25 is not covered by the housing 41).

The connectors 43a and 43b are the same as the connector 23 shown in FIG. 4. That is, each of the connectors 43a and 43b is equipped with a power source connection terminal T20, a signal connection terminal T21, a ground connection terminal T22, and a shell (metal part of outer circumference) connected to a frame ground FG. The two connectors 43a and 43b are arranged so that the cable CB can be connected to both sides of an upper side (a side of the end E1) and a lower side (a side of the end E2) of the antenna module 40. One of the connectors 43a and 43b may be omitted.

Figure 7:
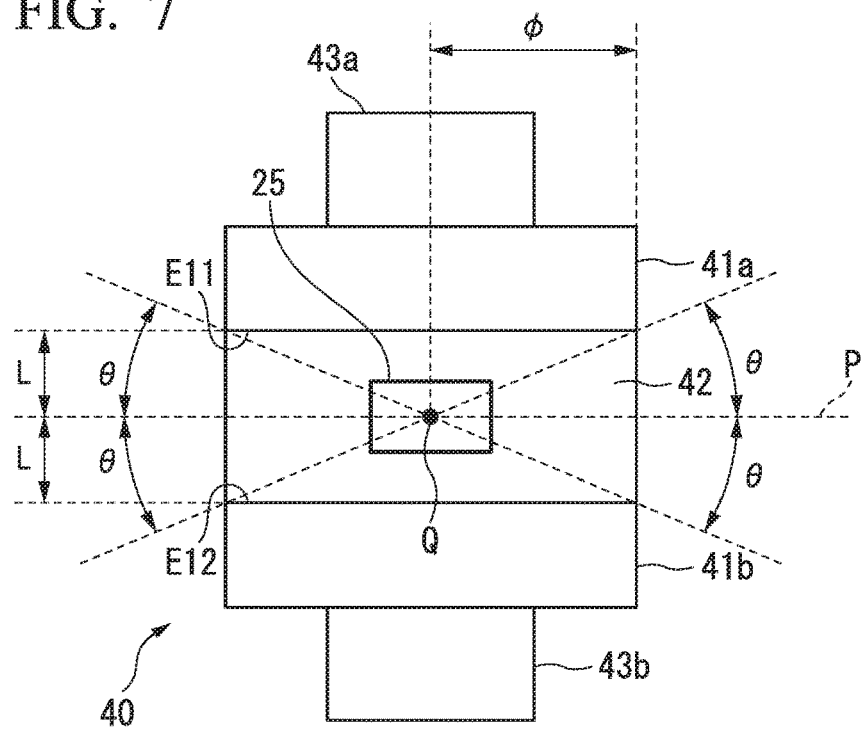
FIG. 7 is a drawing for describing an attachment position of the antenna of the antenna module in the second embodiment of the present invention.

FIG. 7 is a drawing for describing an attachment position of the antenna of the antenna module in the second embodiment of the present invention. Also in the present embodiment, in order to describe simply, an example that the antenna 25 is non-directional in a reference plane P will be described. As shown in FIG. 7, θ is a 3 dB half-value angle of the antenna 25 with reference to the reference plane P which is perpendicular to an axis of the housing 41 (housings 41a and 41b) and includes the feeding point Q of the antenna 25, and φ is an external radius of the housing 41. In a case that an outer shape of the housing 41 is a columnar shape, the external radius φ is determined as shown in FIG. 5B. In a case that the outer shape of the housing 41 is a square pillar shape, the external radius φ is determined as shown in FIG. 5C.

The antenna 25 is mounted on a position where a distance from the feeding point Q in an axis direction of the housing 41 to the ends E1 and E2 is the shortest distance L as shown in the formula (2). That is, in the first embodiment, since the antenna 25 is stored in the antenna cap 22 disposed in an end of the housing 21, the attachment position of the antenna 25 is decided in consideration of the influence of the housing 21. On the other hand, in the present embodiment, since the antenna 25 is stored in the antenna casing 42 disposed between the housing 41a and the housing 41b, the attachment position of the antenna 25 is decided in consideration of the influence of the housings 41a and 41b. The antenna 25 may be attached to a position where the distance from the feeding point Q to at least one of the housings 41a and 41b is slightly longer than the shortest distance L, as long as the unnecessary radiation is permissible.

The antenna module 40 of the present embodiment is different, in an attachment position of the antenna 25 and a number of connectors, from the antenna module 20, but the antenna module 40 is the same function as the antenna module 20. For this reason, like the antenna module 20, since the flexibility of the installation position can be improved, if the antenna module 20 is installed in a place where a radio wave state is good, stable wireless communications can be performed. Moreover, since most of the unnecessary radiation emitted from the circuit which deals with wireless signals of the antenna module 40 is blocked by the housing 41, the unnecessary radiation can be suppressed as much as possible. Thus, in the present embodiment, the unnecessary radiation can be suppressed, and stable wireless communications can be realized irrespective of the installation position of the field device.

Although a process control apparatus, an antenna module, a wireless device, and a field device control system according to embodiments of the present invention have been described above, the present invention is not restricted to the above-described embodiments, and can be freely modified within the scope thereof. For example, although the foregoing descriptions of the embodiments have been examples in which the power source B is disposed in the signal processing module 10, and electric power is supplied from the signal processing module 10 to the antenna module 20. However, the power source B of the signal processing module 10 may be omitted, and electric power may be supplied from the field device FD to the signal processing module 10 and the antenna module 20. Moreover, a power source may be disposed in the antenna module 20.

In the above-described embodiment, although the foregoing descriptions of the embodiments have been examples in which the wireless device 1 measures flow quantity of fluid as state quantity in an industrial process, the present invention can be also applied to a wireless device which measures the other state quantity (for example, pressure, temperature, and so on). Moreover, in the above-described embodiment, although the foregoing descriptions of the embodiments have been examples in which the wireless device performs wireless communications in conformity with ISA100.11a, the present invention can be also applied to a wireless device which performs wireless communications in conformity with WirelessHART (registered trademark), a wireless device which performs wireless communications in conformity with Wi-Fi (registered trademark), or a wireless device which performs wireless communications in conformity with ZigBee (registered trademark).

REFERENCE SIGNS LIST

1 Wireless device
10 Signal processing module
20 Antenna Module
21 Housing
22 Antenna Cap
23 Connector
24 Circuit
24a Transmitter/receiver
24b Signal processor
24c Wireless processor
25 Antenna
40 Antenna Module
41 Housing
42 Antenna casing
43a and 43b Connector
B Power source
C0 Connector
C12 Connector
CB Cable
FD Field device
FG Frame ground
L12 Ground line
L10 Power source line
L11 Signal line
Q Feeding point
SD Shield
SG Signal ground
T20 Power source connection terminal
T21 Signal connection terminal
T22 Ground connection terminal

The invention claimed is:
1. An antenna module comprising:
an antenna;
a circuit configured to transmit and receive wireless signals by using the antenna;

a housing that stores the circuit to cover circumference of the circuit;

an antenna casing that stores the antenna to enable the antenna to transmit and receive wireless signals; and a first connector that is connected to the housing, the first connector being configured to input and output signals which are transmitted and received by the circuit, wherein a shortest distance L between a feeding point of the antenna and the housing, in an axis direction of the housing, is represented by following formula:

$$L = \varphi \times \tan\theta,$$

where θ is a 3 dB half-value angle of the antenna with reference to a plane which is perpendicular to an axis of the housing and includes the feeding point of the antenna, and φ is an external radius of the housing.

2. The antenna module according to claim 1, wherein the circuit comprises:

a transmission/reception circuit configured to receive a signal transmitted from outside through the first connector, and transmit a signal to outside through the first connector; and a wireless signal processing circuit configured to transmit the signal, which is received by the transmission/reception circuit, from the antenna as a wireless signal, the wireless signal processing circuit being configured to process a wireless signal received by the antenna.

3. The antenna module according to claim 1, wherein the first connector comprises:

a first ground connector that is connected, through an external connector, to a signal ground which determines a reference potential of the circuit; and a second ground connector that is connected, through an external connector, to a frame ground which determines a potential of the housing.

4. The antenna module according to claim 3, wherein the first connector comprises:

a signal connector that is connected to a signal input/output terminal of the external connector; and a power source connector that is connected to a power source of the circuit through the external connector.

5. The antenna module according to claim 1, wherein the housing is made of material which blocks the wireless signals.

6. The antenna module according to claim 1, wherein the antenna casing is made of material which transmits the wireless signals.

7. The antenna module according to claim 1, wherein a surface layer of the circuit is coated with resin.

8. The antenna module according to claim 1, wherein inside of the housing is filled with resin.

9. The antenna module according to claim 1, wherein the antenna is a microstrip antenna formed on a substrate.

10. The antenna module according to claim 1, wherein the housing comprises:

a first housing disposed on a first end of the antenna module; and a second housing disposed on a second end which is an end opposite to the first end, wherein the antenna and the antenna casing are disposed between the first housing and the second housing.

11. The antenna module according to claim 10, wherein the first connector is disposed on both the first housing and the second housing.

12. A wireless device which transmits wirelessly a first signal transmitted from a field device and receives wirelessly a second signal to be transmitted to the field device, the wireless device comprising:

an antenna module which is disposed outside the field device;

a signal processing module which is disposed outside the field device in a state that the signal processing module is connected to the field device and the antenna module, the signal processing module comprising a semiconductor chip, which performs communication processing with the field device, communication processing with the antenna module, and conversion processing of a communication protocol, and a housing that stores the semiconductor chip, wherein the antenna module comprises:

an antenna;

a circuit configured to receive the first signal transmitted from the signal processing module and configured to transmit wirelessly the first signal from the antenna, the circuit being configured to generate the second signal based on a wireless signal received by the antenna and configured to transmit the second signal to the signal processing module;

a housing that stores the circuit to cover circumference of the circuit;

an antenna casing which is disposed in an end of the housing or both ends of the housing, the antenna casing storing the antenna to enable the antenna to transmit and receive wireless signals; and a first connector that is connected to the housing and connected to the signal processing module.

13. The wireless device according to claim 12, wherein the signal processing module comprises:

a second connector configured to transmit signals to the first connector of the antenna module and receive signals from the first connector of the antenna module.

14. The wireless device according to claim 13, further comprising:

a cable that connects between the first connector and the second connector.

15. The wireless device according to claim 14, wherein the cable comprises:

a ground line that is connected to a signal ground which determines a reference potential of the circuit disposed in the antenna module;

a signal line that is connected to the circuit, and in which signals are transmitted to the field device and received from the field device;

a power source line that is connected to a power source of the circuit; and a shield that is disposed around the ground line, the signal line, and the power source line, the shield being connected to a frame ground which determines a potential of the housing of the antenna module.

16. A field device control system comprising:

a field device; and a wireless device which transmits wirelessly a first signal transmitted from the field device and receives wirelessly a second signal to be transmitted to the field device, wherein the wireless device comprises:

an antenna module which is disposed outside the field device;

a signal processing module which is disposed outside the field device in a state that the signal processing module is connected to the field device and the antenna module, the signal processing module comprising a semiconductor chip which performs communication processing with the field device, communication processing with the antenna module, and conversion processing of a communication protocol, and a housing that stores the semiconductor chip, wherein the antenna module comprises:
an antenna;
a circuit configured to receive the first signal transmitted from the signal processing module and configured to transmit wirelessly the first signal from the antenna, the circuit being configured to generate the second signal based on a wireless signal received by the antenna and configured to transmit the second signal to the signal processing module;
a housing that stores the circuit to cover circumference of the circuit;
an antenna casing which is disposed in an end of the housing or both ends of the housing, the antenna casing storing the antenna to enable the antenna to transmit and receive wireless signals; and
a first connector that is connected to the housing and connected to the signal processing module.

17. The field device control system according to claim 16, wherein
the signal processing module comprises:
a second connector configured to transmit signals to the first connector of the antenna module and receive signals from the first connector of the antenna module.

18. The field device control system according to claim 17, further comprising:
a cable that connects between the first connector and the second connector.

19. The field device control system according to claim 18, wherein
the cable comprises:
a ground line that is connected to a signal ground which determines a reference potential of the circuit disposed in the antenna module;
a signal line that is connected to the circuit, and in which signals are transmitted to the field device and received from the field device;
a power source line that is connected to a power source of the circuit; and
a shield that is disposed around the ground line, the signal line, and the power source line, the shield being connected to a frame ground which determines a potential of the housing of the antenna module.

\* \* \* \* \*